(12) United States Patent
Stern et al.

(10) Patent No.: US 7,797,314 B2
(45) Date of Patent: Sep. 14, 2010

(54) ADAPTIVE SEARCHING

(75) Inventors: Edith Helen Stern, Yorktown Heights, NY (US); Patrick Joseph O'Sullivan, Ballsbridge (IE); Robert Cameron Weir, Westford, MA (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 11/967,379

(22) Filed: Dec. 31, 2007

(65) Prior Publication Data
US 2009/0171941 A1 Jul. 2, 2009

(51) Int. Cl.
G06F 7/00 (2006.01)
G06F 17/30 (2006.01)
(52) U.S. Cl. .................. 707/723; 707/777; 707/794
(58) Field of Classification Search .............. 707/5, 707/723
See application file for complete search history.

(56) References Cited

U.S. PATENT DOCUMENTS

| | | | | |
|---|---|---|---|---|
| 2003/0020749 A1* | 1/2003 | Abu-Hakima et al. | ....... | 345/752 |
| 2003/0212745 A1* | 11/2003 | Caughey | ..................... | 709/206 |
| 2005/0222981 A1* | 10/2005 | Lawrence et al. | ............... | 707/3 |
| 2005/0278317 A1* | 12/2005 | Gross et al. | ..................... | 707/3 |
| 2006/0224587 A1* | 10/2006 | Zamir et al. | .................... | 707/7 |
| 2006/0242129 A1* | 10/2006 | Libes et al. | ..................... | 707/3 |
| 2007/0043704 A1* | 2/2007 | Raub et al. | ..................... | 707/3 |
| 2007/0204022 A1* | 8/2007 | Hsu et al. | .................... | 709/223 |
| 2007/0233671 A1* | 10/2007 | Oztekin et al. | ................. | 707/5 |
| 2007/0244884 A1* | 10/2007 | Yang | .............................. | 707/5 |
| 2008/0010252 A1* | 1/2008 | Zamir et al. | .................... | 707/3 |
| 2008/0027921 A1* | 1/2008 | Chandrasekar et al. | ......... | 707/4 |
| 2008/0052272 A1* | 2/2008 | Altaf et al. | ..................... | 707/3 |
| 2008/0059447 A1* | 3/2008 | Winner et al. | .................. | 707/5 |
| 2008/0126303 A1* | 5/2008 | Park et al. | ...................... | 707/3 |
| 2008/0228776 A1* | 9/2008 | Weiss et al. | .................... | 707/10 |
| 2008/0301112 A1* | 12/2008 | Wu | ................................ | 707/5 |
| 2009/0006388 A1* | 1/2009 | Ives et al. | ....................... | 707/5 |
| 2009/0019035 A1* | 1/2009 | House et al. | .................... | 707/5 |
| 2009/0100047 A1* | 4/2009 | Jones et al. | ..................... | 707/5 |
| 2009/0144392 A1* | 6/2009 | Wang et al. | ................. | 709/217 |

* cited by examiner

Primary Examiner—Don Wong
Assistant Examiner—Binh V Ho
(74) Attorney, Agent, or Firm—Holland & Knight LLP; Brian J Colandreo, Esq.; Mark H. Whittenberger

(57) ABSTRACT

A method and computer program product for receiving a search result set including one or more search results, and defining one or more ranking cues based upon, at least in part, ancillary user data. The one or more search results are ranked based upon, at least in part, the one or more ranking cues. The one or more ranked search results are provided to a search user.

20 Claims, 5 Drawing Sheets

Search results for: realtime network topology rank search results ─── 112

Cisco Active Network Abstraction 4.0 | Cisco Active Network ...

Standards-based access to near real-time network element and network ... Automatic discovery of network topology uses Cisco Discovery Protocol and BGP. ...
www.cisco.com/en/US/products/ps5776/products_data_sheet0900aecd806c6fc0.html - 54k - Cached - Similar pages Cisco Active Network Abstraction 3.6 | Cisco Active Network ...

Standards-based access to near real-time device and network information: Through a near real-time virtual network model, Cisco ANA provides value-added ...
www.cisco.com/en/US/products/ps5776/products_data_sheet0900aecd806b6fed.html - 57k - Cached - Similar pages Network Topology Software Download Shareware Freeware, AdRem ...

Popular Network Topology Shareware (AdRem NetCrunch, Cisco CDP Monitor, ...). ... Monitor network and all of TCP,UDP SOCKETS traffic in realtime ...
www.supershareware.com/get/network-topology.html - 55k - Cached - Similar pages Network Management for the Cisco ONS 15540 ESP The following network management applications support the Cisco ONS 15540 ESP. ... Real-time network surveillance with configurable popup alarm and event ...
www.cisco.com/univercd/cc/td/doc/product/mels/ons_540/net_mgmt.htm - 27k - Cached - Similar pages Network topology downloads - XRatel SNMP OPC/DDE Server ...

Cisco CDP Monitor is an efficient network diagnostic and troubleshooting tool. ... collect trending data, monitor bandwidth utilization in real-time. ...
www.webpicturecreator.com/network-topology.htm - 47k - Cached - Similar pages [PDF]

Network Management for the Cisco ONS 15540 ESPs

File Format: PDF/Adobe Acrobat - View as HTML
Ability to form Custom Groups in Topology View based on criteria like SysLocation ... Real-time network surveillance with configurable popup alarm and event ...
www.cisco.org.lv/univercd/cc/td/doc/product/mels/15540x/nms_540x.pdf - Similar pages Cisco Network Topologies and LAN Design > Foundation Topics Three different network topology models are discussed in the following sections: ...... The PIX Firewall operates on a secure real-time kernel, not on UNIX. ...
www.ciscopress.com/articles/article.asp?p=24101 - 121k - Cached - Similar pages network topology - Allows identify the country by IP Address ...

network topology - Allows identify the country by IP Address. ... ipMonitor 7 is a secure real-time network monitoring software designed to proactively ...
network-topology.vista-files.org/ - 19k - Cached - Similar pages Network Topology Program Downloads at File Heap Cisco CDP Monitor is an efficient network diagnostic and troubleshooting tool. ... displayed in real-time. The network probe runs in Windows NT/2000/XP and ...
www.fileheap.com/software/network_topology.html - 111k - Cached - Similar pages Network Topology Shareware, Freeware, Software Download Cisco CDP Monitor is an efficient network diagnostic and troubleshooting tool. ... Provides sophisticated features for real-time monitoring and graphing ...
sharene.com/showall/Network-Topology.html - 37k - Cached - Similar pages 1 2 3 4 5 6 7 8 9 10 Next (100)

FIG. 5

ADAPTIVE SEARCHING

FIELD OF THE DISCLOSURE

The present disclosure generally relates to Internet searching, and more particularly to providing more relevant search results based upon social network and personal cues.

BACKGROUND

The Internet provides an incredible wealth of information that is readily available. While the vast wealth of electronic content available provides consumers with an astounding amount of available information, the great quantity of available information presents challenges in locating particular information that is of interest to a given person at a given time. Various search engines and cataloging systems facilitate finding desired information, unfortunately such search engines and cataloging systems typically base search results upon embedded metadata, text analytics, and the like. As such, while search results from search engines and cataloging systems may relate to the searched topic, the relevance to a person's particular interest may be lacking.

Efforts to improve the ease with which consumers can access information that they consider relevant and useful generally include increasing the complexity of search queries that may be used. Similarly, the use of non-query limitations are being implemented, in which the consumer can limit the domains searched. For example, a search may be limited to only educational sites (i.e., .edu domains), or may be limited to a particular company (e.g., ibm.com). Such solutions are not fully effective because they may unduly limit the scope of the search and may rely on terminology that the consumer derives, which may vary from consumer to consumer.

SUMMARY OF THE DISCLOSURE

According to a first implementation, a method includes receiving a search result set including one or more search results, and defining one or more ranking cues based upon, at least in part, ancillary user data. The one or more search results are ranked based upon, at least in part, the one or more ranking cues. The one or more ranked search results are provided to a search user.

One or more of the following features may be included. The ancillary user data may include email content of the search user. The ancillary user data may include email content of one or more members of a social network of the search user. The ancillary user data may include at least a portion of web browser history data of one or more members of a social network of the search user. The ancillary user data may include at least a portion of a search history of the search user. The ancillary user data may include at least a portion of a search history of one or more members of a social network of the search user. The ancillary user data may include data from one or more predetermined websites.

Defining the one or more ranking cues may include defining one or more ranking cues based upon, at least in part, a temporal attribute of the ancillary user data. Defining the one or more ranking cues may include receiving the ancillary user data from a data store. Defining the one or more ranking cues may include accessing one or more of an email server and a document server, and extracting the ancillary user data from one or more of the email server and the document server.

According to a second implementation, a computer program product resides on a computer readable medium having a plurality of instructions stored on it. When executed by a processor, the instructions cause the processor to perform operations including receiving a search result set including one or more search results, and defining one or more ranking cues based upon, at least in part, ancillary user data. The one or more search results are ranked based upon, at least in part, the one or more ranking cues The one or more ranked search results are provided to a search user.

One or more of the following features may be included. The ancillary user data may include email content of the search user. The ancillary user data may include email content of one or more members of a social network of the search user. The ancillary user data may include at least a portion of web browser history data of one or more members of a social network of the search user. The ancillary user data may include at least a portion of a search history of the search user. The ancillary user data may include at least a portion of a search history of one or more members of a social network of the search user. The ancillary user data may include data from one or more predetermined websites.

The instructions for defining the one or more ranking cues may include instructions for defining one or more ranking cues based upon, at least in part, a temporal attribute of the ancillary user data. The instructions for defining the one or more ranking cues may include instructions for receiving the ancillary user data from a data store. The instructions for defining the one or more ranking cues may include instructions for accessing one or more of an email server and a document server, and extracting the ancillary user data from one or more of the email server and the document server.

The details of one or more implementations are set forth in the accompanying drawings and description below. Other features and advantages will become apparent from the description, the drawings, and the claims.

BRIEF DESCRIPTION OF THE DRAWINGS

FIG. 5 is a diagrammatic view of a display screen rendered by the client application and/or the ranking process of FIG. 1.

DETAILED DESCRIPTION OF PREFERRED EMBODIMENTS

Figure 1:
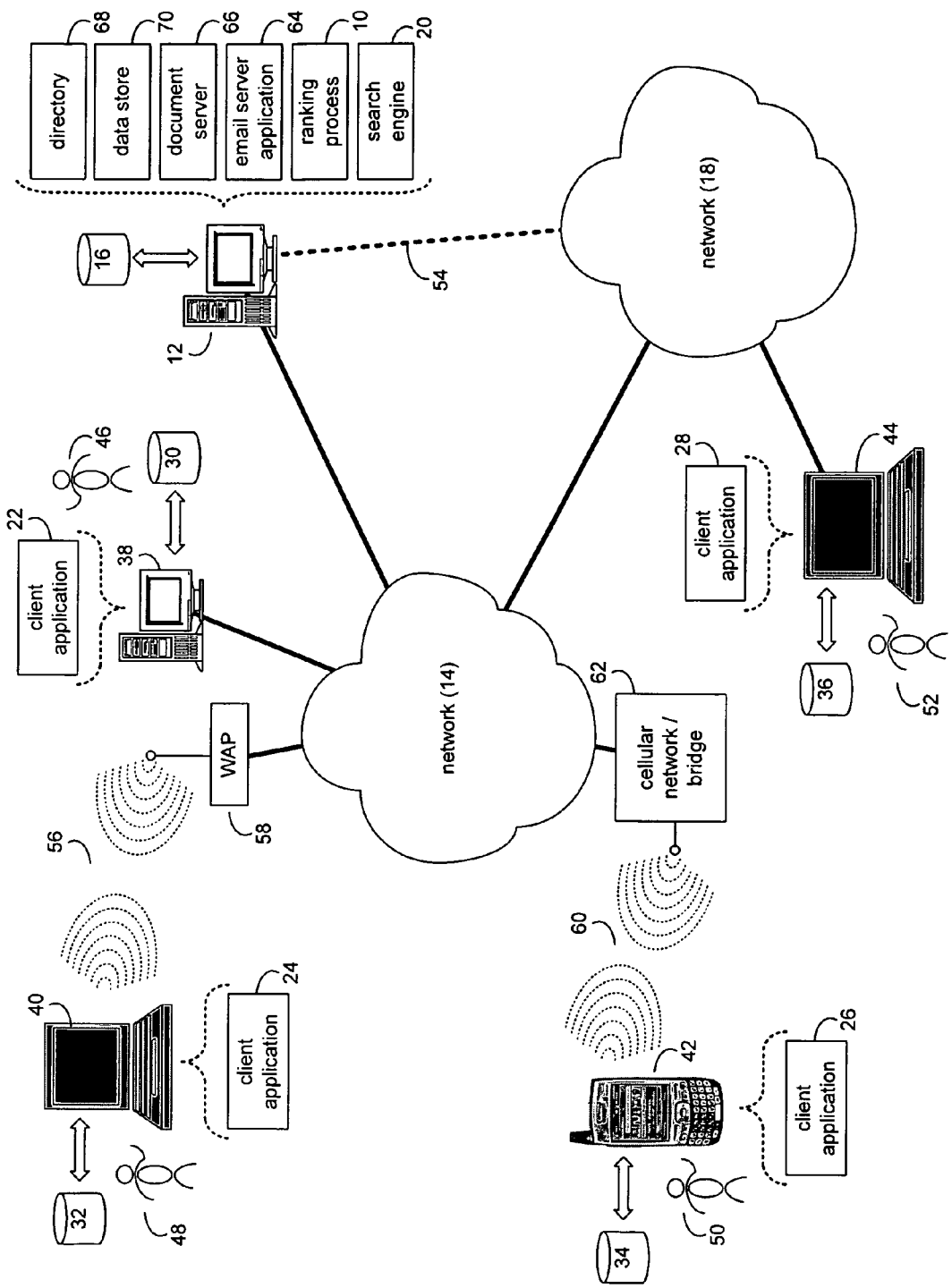
FIG. 1 diagrammatically depicts a ranking process and a client application coupled to a distributed computing network.

System Overview:

Referring to FIG. 1, there is shown ranking process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example.

As will be discussed below in greater detail, ranking process 10 may receive a search result set including one or more search results. One or more ranking cues may be defined based upon, at least in part, ancillary user data. The one or more search results may be ranked based upon, at least in part, the one or more ranking cues. The one or more ranked search results may be provided to a search user.

The instruction sets and subroutines of ranking process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute search engine 20, examples of which may include, but are not limited to Google Internet search engine, Yahoo Internet search engine, and the like. Search engine 20 may be accessed by/interact with one or more client application (e.g., client applications 22, 24, 26, 28), examples of which may include but are not limited to a web browser, and a proprietary search engine interface application. Ranking process 10 may be a stand alone application that interfaces with search engine 20 or an applet/application that is executed within search engine 20.

The instruction sets and subroutines of search engine 20, which may be stored on storage device 16 coupled to server computer 12 may be executed by one or more processors (not shown) and one or more memory architectures (not shown) incorporated into server computer 12. Further, while ranking process 10 and search engine 20 are shown residing on the same server computer, this is for illustrative purposes only, and should not be construed as being a limitation of this disclosure as various alternative implementations may be equally utilized. For example, a search engine may reside on a separate server computer (not shown) from server computer 12, upon which ranking process 10 resides. In such an implementation, ranking process 10 may interact with the search engine residing on a separate server computer via one or more of network 14 and network 18. Other implementations are similarly considered within the scope of this disclosure.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled cellular telephone (not shown), and a dedicated network device (not shown), for example. Using client applications 22, 24, 26, 28, users 46, 48, 50, 52 may access search engine 20 and may conduct searches, e.g., including internet searches, searches within document servers, and the like.

Users 46, 48, 50, 52 may access search engine 20 directly through the device on which the client application (e.g., client applications 22, 24, 26, 28) is executed, namely client electronic devices 38, 40, 42, 44, for example. Users 46, 48, 50, 52 may access search engine 20 directly through network 14 or through secondary network 18. Further, server computer 12 (i.e., the computer that executes search engine 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

The Ranking Process:

For the following discussion client application 22 is going to be described for illustrative purposes. However, this is not intended as a limitation of the disclosure, as other client applications (e.g., client application 24, 26, 28) may be equally utilized.

Figure 2:
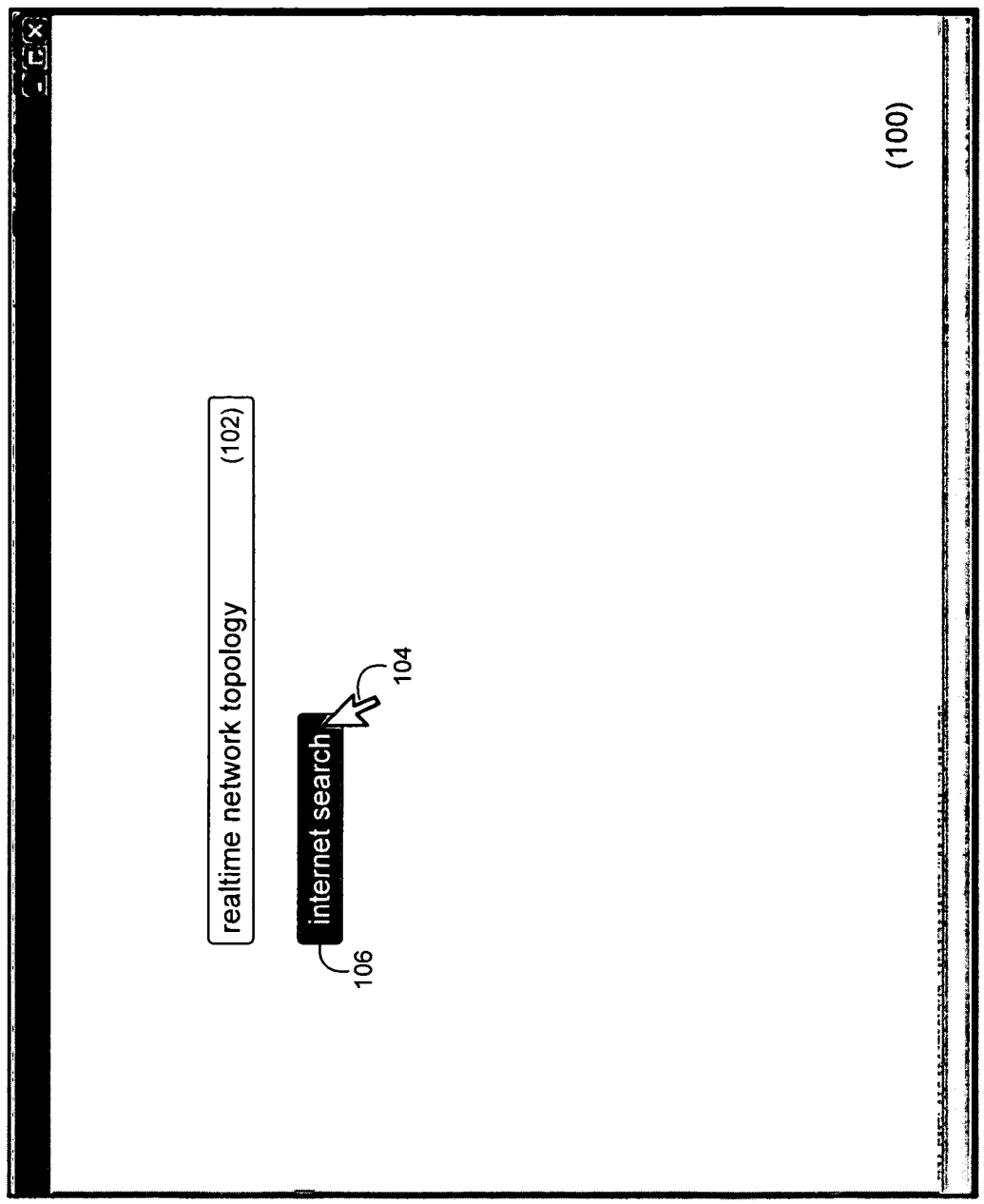
FIG. 2 diagrammatically depicts a display screen rendered by the client application of FIG. 1.

Referring also to FIG. 2, client application 22 may include a web browser that may allow user 46 to access search engine 20 (e.g., which may be configured to conduct internet searches). Client application 22 (alone or in conjunction with one or more of search engine 20 and ranking process 10) may render search screen 100 including search input field 102. While not shown, search screen 20 may include various additional and/or alternative fields, information, and the like, which may, for example, allow user 46 to define search parameters, etc. Client application 22 may allow user 46 to input, e.g., using a keyboard (not shown), a desired search argument (namely "realtime network topography"). Once the desired search argument has been input into search input field 102, user 46 may initiate the search, e.g., by selecting, via onscreen pointer 104 (which may be controlled by a pointing device, such as a mouse; not shown) "internet search" button 106.

Figure 3:
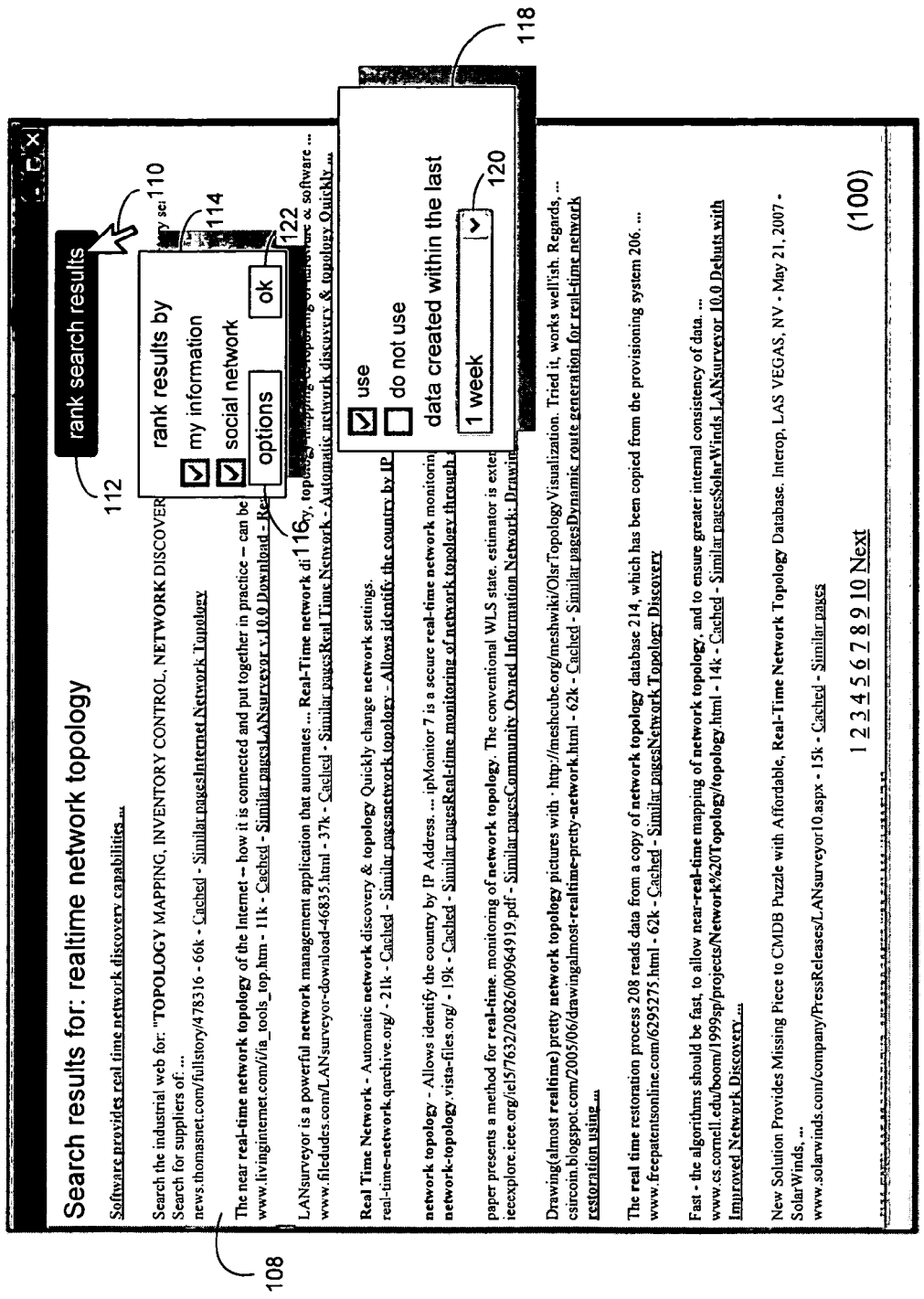
FIG. 3 diagrammatically depicts a display screen rendered by the client application and/or the ranking process of FIG. 1.

Selecting "internet search" button 106 may result in search engine 20 conducting a search (e.g., using any of various known searching methodologies and/or algorithms) of the internet relative to the search argument "realtime network topology". Referring also to FIG. 3, search engine 20 may generate a search result set (e.g., search result set 108) based upon, at least in part, the search argument "realtime network topology". The search result set generated by search engine 20 may include one or more search results, e.g., including web pages, documents, and various other Internet-accessible content, deemed to be relevant to the search argument "realtime network topology" by search engine 20.

Figure 4:
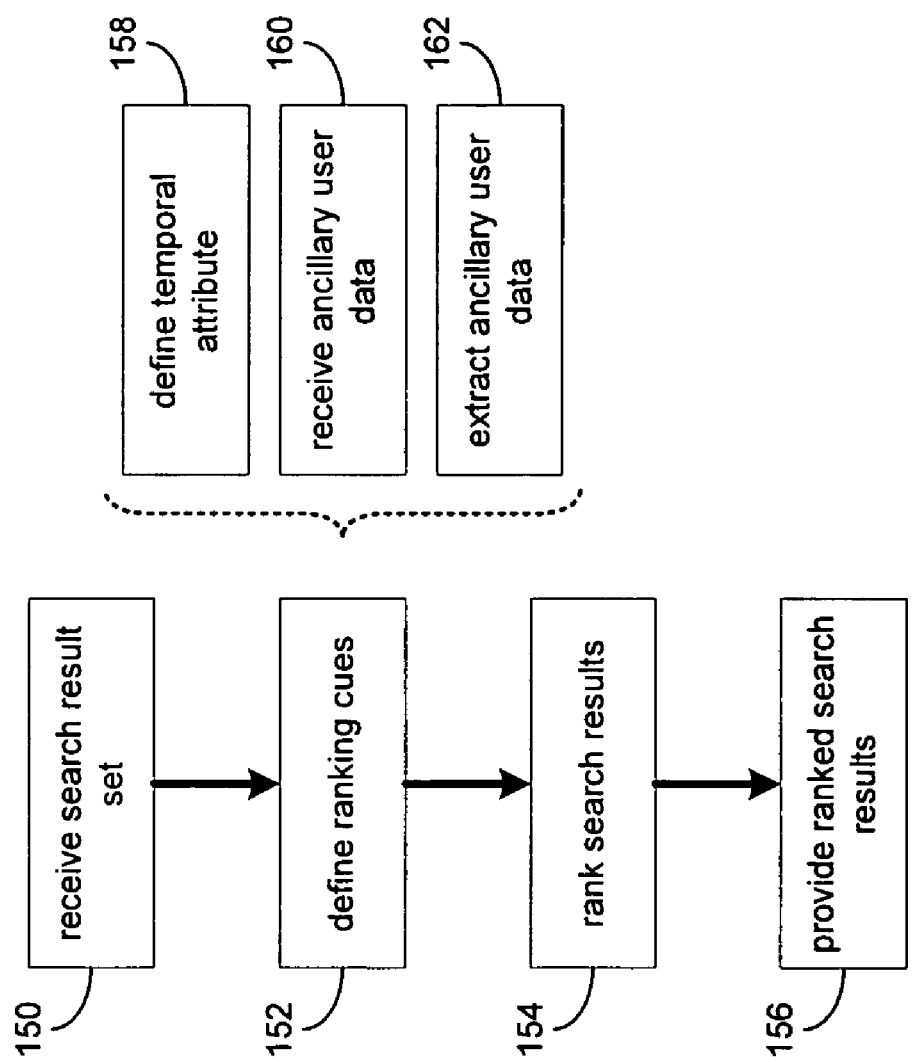
FIG. 4 is a flowchart of a process executed by the ranking process of FIG. 1.

Referring also to FIG. 4, ranking process 10 may receive 150 the search result set including one or more search results. Further, ranking process 10 may define 152 one or more ranking cues based upon, at least in part, ancillary user data. The one or more search results may be ranked 154 based upon, at least in part, the one or more ranking cues. The one or more ranked search results may be provided 156 to a search user. While search result set 108 has been illustrated herein, it should be understood that this is for the purpose of explanation, as ranking process 10 may receive 150 the search result set (e.g., from search engine 20) and may rank 154 the one or more results without the un-ranked result being displayed by client application 22 and/or ranking process 10.

Ancillary user data may include any variety of data, which may not be specifically related to the search being conducted by user 46. As such, the ancillary user data may embody experiences and knowledge of user 46. For example, the ancillary data may include email content mined from user 46's email. Email content of user 46 may be stored in connection with an email server application (e.g., email server application 64 residing on server computer 12). Similarly, the ancillary user data may include information from at least a portion of a search history of searches previously conducted (e.g., via client application 22, or other search applications) by user 46. Further ancillary user data may include, for example, information mined from user 46's documents, such as presentation slides, word processing documents, and the like. User 46's documents may be, for example, stored on client electronic device 38, in a document server (e.g., document server 66 residing on server computer 12), etc. While email server application 64 and document server 66 are shown residing on server computer 12 this is merely for illustrative purposes, as email server application 64 and/or document server 66 may reside on one or more additional server computers coupled to one or more of networks 14, 18.

Ancillary user data may also include information created and/or maintained by one or more members of a social network of the search user. The social network of the search user may include, for example, users with whom the search user has a relationship, e.g., as evidenced by, for example, exchanges of email, exchanges of instant messages, common attendance at scheduled events (e.g., as indicated in a calendaring/scheduling application), and the like. Additionally, the social network of the search user may be based upon, at least in part, an organizational structure, e.g., of the company for which the search user works. The organizational structure may be stored, for example, in a corporate directory (e.g., directory 68 residing on server computer 12). For example, the search users social network may include the members of the search user's team or department, the search user's immediate manager and immediate subordinates, and the like.

Accordingly, the ancillary user data may include email content of one or more members of the social network of the search user. Email content of the one or more members of the social network of the user may, for example, be stored in connection with email server application 64. Further, the ancillary user data may include at least a portion of web browser history data of one or more members of the social network of the search user. The web browser history data of the one or more members of the social network of the search user may, for example, be stored in data store 70 (e.g., which may include, for example, a database) residing on server computer 12. Ancillary user data may also include at least a portion of a search history of one or more members of the social network of the search user. As with web browser history data, the at least a portion of a search history of one or more members of the social network of the search user may be stored in data store 70. Ancillary user data may also include data from one or more predetermined websites, such as a corporate webside of the company the search user works for.

Continuing with the above-stated example, on FIG. 3, user 46 may select, via onscreen pointer 110 controlled by a pointing device (e.g., a mouse; not shown), "rank search results" button 112. Selecting "rank search results" button 112 may result in ranking process 10 and/or client application 22 rendering pop-up 114. Ranking process 10 may allow user 46 to select, via pop-up 114, to rank the search results by user information and/or social network information. As such, user 46 may choose to have the search results ranked based only upon his ancillary user data, based only upon ancillary user data of his social network, or based upon both his ancillary user data and ancillary user data of his social network. In an alternate embodiment, ranking is performed without user intervention, for example based on company policy.

Defining 152 the one or more ranking cues may include defining 158 the one or more ranking cues based upon, at least in part, a temporal attribute of the ancillary user data. For example, ranking process 10 may allow user to define temporal constraints for defining 152 the one or more ranking cues, e.g., by selecting, via onscreen pointer 110, "option" button 116 from within pop-up 114. Selecting "option" button 116 may result in ranking process 10 and/or client application 22 rendering pop-up 118 including the options "use" and "do not use" data created within the last "1 week". The time period (i.e., 1 week) may be altered, e.g., via pull-down menu 120, allowing user 46 to select a desired time period. As such, user 46 may elect to use only ancillary user data created within the desired time period, or to only use ancillary user data created prior to the desired time period.

Upon defining the desired ranking options and time period from within pop-up 118, user 46 may select, via onscreen pointer 110, "ok" button 122 from within pop-up 114. Selecting "ok" button 122 from within pop-up 114 may result in ranking process 10 defining 152 the one or more ranking cues based upon, at least in part, the user defined sources of ancillary user data and the user defined (if any) ranking options and time period.

Defining 152 the one or more ranking cues may include receiving 160 the ancillary user data from data store 70. For example, as described above, at least a portion of the ancillary user data (e.g., user documents, search history data, web browser data) may be stored in data store 70. Ranking process 10 may receive 160 at least a portion of the ancillary user data from data store 70. Additionally/alternatively, defining 152 the one or more ranking cues may include accessing one or more of email server application 64 and a document server 66, and extracting 162 at least a portion of the ancillary user data from one or more of the email server application 64 and the document server 66.

Ranking process 10 may rank 154 the one or more results of result set 108 based upon, at least in part, the one or more ranking cues. Ranking 154 the one or more results may include prioritizing the one or more results based upon, at least in part, the one or more ranking cues, rather than, for example, utilizing the ranking cues as searching parameters.

For example, ancillary user data may include user 46's email content. User 46's email may include a number of emails pertaining to Cisco Systems Inc. Ranking process 10 may rank one or more of the search results of result set 108 including a reference to Cisco Systems Inc. higher than search results not containing a reference to Cisco Systems Inc. As such, and referring also to FIG. 5, ranking process 10 may provide 156 ranked result set 200 in which the one or more search results containing a reference to Cisco Systems Inc. may appear earlier in search result set 200, e.g., as compared to result set 108.

As mentioned above, while un-ranked result set 108 has been depicted and discussed, providing the un-ranked result set is not intended to be a limitation of this disclosure. For example, ranking process 10 may rank 154 the one or more results of the result set without first providing an un-ranked results set.

A number of implementations have been described. Nevertheless, it will be understood that various modifications may be made. Accordingly, other implementations are within the scope of the following claims.

What is claimed is:

1. A method comprising:
   receiving, at one or more of a server computer and a client electronic device, a search result set including one or more search results;
   providing, at one or more of the server computer and the client electronic device, a search user with a first option of ranking the search result set based upon, at least in part, one or more selections of ancillary data, the ancillary data including user information and social network information;
   providing, at one or more of the server computer and the client electronic device, the search user with a second option of ranking the search result set based upon, at least in part, an adjustable user-selectable time-period;
   defining, at one or more of the server computer and the client electronic device, one or more ranking cues based upon, at least in part, the ancillary user data;
   ranking, at one or more of the server computer and the client electronic device, the one or more search results based upon, at least in part, the one or more ranking cues; and
   providing, at one or more of the server computer and the client electronic device, the one or more ranked search results to the search user.

2. The method of claim 1, wherein the ancillary user data includes email content of the search user.

3. The method of claim 1, wherein the ancillary user data includes email content of one or more members of a social network of the search user.

4. The method of claim 1, wherein the ancillary user data includes at least a portion of web browser history data of one or more members of a social network of the search user.

5. The method of claim 1, wherein the ancillary user data includes at least a portion of a search history of the search user.

6. The method of claim 1, wherein the ancillary user data includes at least a portion of a search history of one or more members of a social network of the search user.

7. The method of claim 1, wherein the ancillary user data includes data from one or more predetermined websites.

8. The method of claim 1, wherein defining the one or more ranking cues includes defining one or more ranking cues based upon, at least in part, a temporal attribute of the ancillary user data.

9. The method of claim 1, wherein defining the one or more ranking cues includes receiving the ancillary user data from a data store.

10. The method of claim 1, wherein defining the one or more ranking cues includes accessing one or more of an email server and a document server, and extracting the ancillary user data from one or more of the email server and the document server.

11. A computer program product residing on a computer readable medium having a plurality of instructions stored thereon, which, when executed by a processor, cause the processor to perform operations comprising:
    receiving a search result set including one or more search results;
    providing a search user with a first option of ranking the search result set based upon, at least in part, one or more selections of ancillary data, the ancillary data including user information and social network information;
    providing the search user with a second option of ranking the search result set based upon, at least in part, an adjustable user-selectable time-period;
    defining one or more ranking cues based upon, at least in part, the ancillary user data;
    ranking the one or more search results based upon, at least in part, the one or more ranking cues; and
    providing the one or more ranked search results to the search user.

12. The computer program product of claim 11, wherein the ancillary user data includes email content of the search user.

13. The computer program product of claim 11, wherein the ancillary user data includes email content of one or more members of a social network of the search user.

14. The computer program product of claim 11, wherein the ancillary user data includes at least a portion of web browser history data of one or more members of a social network of the search user.

15. The computer program product of claim 11, wherein the ancillary user data includes at least a portion of a search history of the search user.

16. The computer program product of claim 11, wherein the ancillary user data includes at least a portion of a search history of one or more members of a social network of the search user.

17. The computer program product of claim 11, wherein the ancillary user data includes data from one or more predetermined websites.

18. The computer program product of claim 11, wherein the instructions for defining the one or more ranking cues include instructions for defining one or more ranking cues based upon, at least in part, a temporal attribute of the ancillary user data.

19. The computer program product of claim 11, wherein the instructions for defining the one or more ranking cues include instructions for receiving the ancillary user data from a data store.

20. The computer program product of claim 11, wherein the instructions for defining the one or more ranking cues include instructions for accessing one or more of an email server and a document server, and extracting the ancillary user data from one or more of the email server and the document server.

* * * * *